United States Patent
McCollum

(10) Patent No.: US 7,533,111 B2
(45) Date of Patent: May 12, 2009

(54) USING SOAP MESSAGES FOR INVERSE QUERY EXPRESSIONS

(75) Inventor: Raymond W. McCollum, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 493 days.

(21) Appl. No.: 11/322,889

(22) Filed: Dec. 30, 2005

(65) Prior Publication Data

US 2007/0162476 A1    Jul. 12, 2007

(51) Int. Cl.
*G06F 17/00* (2006.01)
(52) U.S. Cl. ..................................... 707/101
(58) Field of Classification Search .................. 707/101
See application file for complete search history.

(56) References Cited

U.S. PATENT DOCUMENTS

| | | | |
|---|---|---|---|
| 6,643,633 | B2 | 11/2003 | Chau et al. |
| 6,836,778 | B2 | 12/2004 | Manikutty et al. |
| 7,219,125 | B1 * | 5/2007 | Day .......................... 709/203 |
| 7,302,492 | B1 * | 11/2007 | Day .......................... 709/238 |
| 2002/0059425 | A1 * | 5/2002 | Belfiore et al. .............. 709/226 |
| 2003/0014733 | A1 | 1/2003 | Ringseth et al. |
| 2003/0182452 | A1 * | 9/2003 | Upton ......................... 709/246 |
| 2003/0212664 | A1 * | 11/2003 | Breining et al. ................ 707/3 |
| 2004/0006744 | A1 | 1/2004 | Jones et al. |
| 2004/0205082 | A1 | 10/2004 | Fontoura et al. |
| 2004/0205567 | A1 | 10/2004 | Nielsen |
| 2004/0205577 | A1 | 10/2004 | Abe et al. |
| 2005/0055355 | A1 | 3/2005 | Murthy et al. |
| 2005/0144137 | A1 * | 6/2005 | Kumar et al. .................. 705/55 |
| 2005/0177543 | A1 | 8/2005 | Chen et al. |
| 2005/0177578 | A1 | 8/2005 | Chen et al. |
| 2005/0187906 | A1 * | 8/2005 | Madan et al. ................... 707/3 |
| 2005/0187907 | A1 * | 8/2005 | Wortendyke et al. ............ 707/3 |
| 2005/0187947 | A1 * | 8/2005 | Wortendyke et al. ........ 707/100 |
| 2005/0198065 | A1 * | 9/2005 | Eppley et al. ............ 707/104.1 |
| 2005/0198154 | A1 * | 9/2005 | Xie et al. .................... 709/206 |

(Continued)

FOREIGN PATENT DOCUMENTS

WO    WO 0221339    3/2002

OTHER PUBLICATIONS

Josifovski, Vanja, et al., "Super-Fast XML Wrapper Generation in DB2: A Demonstration", ICDE '03, Mar. 5-8, 2003, pp. 756-758.*

(Continued)

*Primary Examiner*—John E Breene
*Assistant Examiner*—Robert Stevens
(74) *Attorney, Agent, or Firm*—Workman Nydegger

(57) ABSTRACT

Embodiments provide for query expressions to be utilized within a SOAP message for content fragment transfer and document update purposes. In one embodiment an inverse query path within a SOAP message in used conjunction with an operation for modifying a targeted XML document. Mechanisms are also provided that allow transferring of fragments of content for an XML document within a SOAP message. Such fragments are usually by themselves not schematically valid. Nevertheless, by encapsulating the fragmented content within a special wrapper construct, the subset of content suddenly become legal XML; thus passing most any validation test imposed by SOAP processors. More specifically, the wrapper construct is itself schematized as requiring that SOAP processors skip or otherwise suppress processing any child elements within the contained wrapper.

17 Claims, 3 Drawing Sheets

U.S. PATENT DOCUMENTS

2005/0267772 A1* 12/2005 Nielsen et al. ............... 705/1
2006/0265689 A1* 11/2006 Kuznetsov et al. .......... 717/117
2008/0040657 A1* 2/2008 Kuznetsov et al. .......... 715/234

OTHER PUBLICATIONS

Offutt, Jeff, et al., "Generating Test Cases for Web Services Using Data Perturbation", TAV-WEB Proceedings / ACM SIGSOFT SEN, vol. 29, No. 5, Sep. 2004, pp. 1-10.*
Curbera, Francisco, et al., "Unraveling the We Services Web: An Introduction to SOAP, WSDL and UDDI", IEEE Internet Computing, vol. 6, Issue 2, Mar. / Apr. 2002, pp. 86-93.*
Mandreoli, Frederica, et al., "Approximate Query Answering for a Heterogeneous XML Document Base", WISE 2004 / LNCS 3306, Springer-Verlag, Berlin, Nov. 1, 2004, pp. 337-351.*
Gudgin, Martin, et al., "SOAP Version 1.2 Part 1: Messaging Framework", W3C Recommendation, Jun. 24, 2003, pp. 1-51.*
Papakonstantinou, Yannis, et al., "XML Queries and Algebra in the Enosys Integration Platform", Data & Knowledge Engineering, vol. 44, Issue 3, Mar. 2003, pp. 299-322.*
Seely, Scott, "An XML Overview Towards Understanding SOAP", Microsoft Developer Network, Nov. 2001, pp. 1-15.*
Ning Wang, et al., "An Efficient XML Schema Typing System," Technical Report 03-25 School of Information and Computer Science University of California, Irvine, CA, Nov. 18, 2003, available at http://computing.breinestorm.net/xml+type+schema+name+string/ (the PDF enclosed entitled "Document 1," 21 pgs.).
Don Box, et al., "Web Services Eventing (WS-EVENTING)," BEA Systems, et al., Aug. 2004 (PDF enclosed entitled "Document 2," 38 pgs.).
Steve Graham, et al., "Publish-Subscribe Notification for Web Services," Version 1.0, Akamai Technologies, et al., Mar. 5, 2004, (PDF enclosed entitled "Document 3," 19 pgs.).
J. Brezak, "HHTP Authentication: SPNEGO Access Authentication as Implemented in Microsoft Windows 2000," Microsoft, Kerberos Working Group, Internet Draft (PDF enclosed entitled "Document 4," 6 pgs.).
Akhil Arora, Web Services for Management (WS-Management Jun. 2005), Advanced Micro Devices, Inc., et al., (PDF enclosed entitled "Document 5," 155 pgs.).
Alexander, et al., "Web Service Transfer (WS-Transfer)," BEA Systems, et al., Sep. 2004, 17 pages.
Alexander, et al., "Web Service Enumeration (WS-Enumeration)," BEA Systems, et al., Sep. 2004, 27 pages.

* cited by examiner

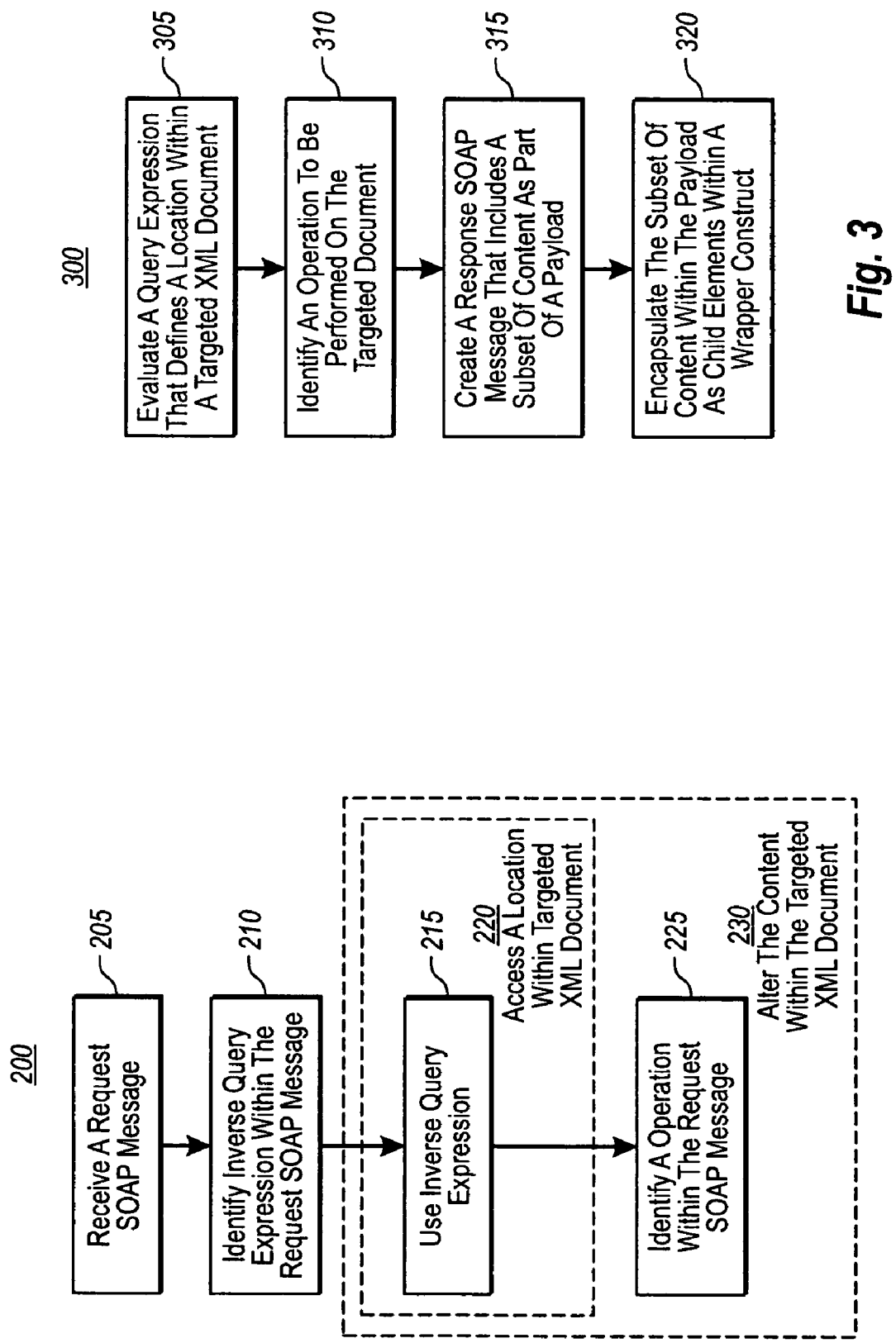

USING SOAP MESSAGES FOR INVERSE QUERY EXPRESSIONS

CROSS-REFERENCE TO RELATED APPLICATIONS

N/A

BACKGROUND

Computer systems and related technology affect many aspects of society. Indeed, the computer system's ability to process information has transformed the way we live and work. Computer systems now commonly perform a host of tasks (e.g., word processing, scheduling, database management, etc.) that prior to the advent of computer systems were performed manually. More recently, computer systems have been coupled to one another to form computer networks over which the computer systems can communicate electronically to share data. Web services have been a driving force in advancing such communications between computer systems and are turning the building and use of software inside-out.

Web services let applications share data, and—more powerfully—invoke capabilities from other applications without regard to how those applications were built, what operating system or platform they run on, and what devices are used to access them. Web services may be invoked over the Internet by means of industry-standard protocols including SOAP (Simple Open Access Protocol), XML (extensible Markup Language), UDDI (Universal Description Discovery Integration), WSDL (Web Service Description Language), etc. Although web services remain independent of each other, they can loosely link themselves into a collaborating group that performs a particular task.

Often, electronic communication on a web service network includes a client computer system (hereafter referred to as a "client") requesting access to a network service (e.g., web services) at a server computer system (hereinafter referred to as a "server," "service," or "web service"). Accordingly, the client sends a request to the service for particular access to its system resources, wherein the service replies with a response message providing the desired information. Of course, other messaging patterns between client and service may be available and include simple singleton messages as well as more sophisticated multi-message exchanges like, e.g., notifications, solicit-response, pub-sub patterns, polling, kick-push, queuing, and others. In addition, there may be other procedures needed for accessing the service resources, such as authentication and validation mechanisms.

Regardless of the type of message patterns and/or procedures used to access a service, web services provide interoperability in a platform agnostic way because both clients and services agree on a basic contract. Represented by a mixture of machine-readable and human languages (i.e., XML), such contracts define, among other things, the operations—units of functionality—offered by the web service and/or the format of the messages passed to and/or returned by each operation when invoked. Network Protocol Description Languages (e.g., WSDL) provide an overall wrapper or specification for describing web service contracts in a common or standard language. Such specifications make it easy for developers and developer tools to create and interpret contracts; and also have extensive tooling suites, which in large part accounts for their popularity.

Typically, most web service contracts define SOAP as the protocol of choice for sending messages between a client and service via the Internet. SOAP is an XML based protocol and forms the foundation layer of a web service stack, providing a basic messaging framework that more abstract layers can build on. A SOAP message contains several elements including: a required root element known as an envelope that identifies the XML document as a SOAP message as well as the schema(s) used therein; an optional header element, which includes processing and application specific information (e.g., authentication, date and time created, message type, message identity, and other information) about the SOAP message; and a required body element that contains call and response information, if any. An optional fault element provides information about errors that occurred while processing the message. If a fault element is present, it typically appears as a child element of the body.

One of the key strengths of SOAP is the ability to encapsulate XML data within a SOAP message. This gives SOAP the flexibility to contain data from any XML schema, which is quite empowering. Schemas provide rigorous rules for ensuring that documents can be handled automatically by the various programs for which the XML data is passed. In other words, an XML schema is a description of a type of XML document, typically expressed in terms of constraints on the structure and content of documents of that type, above and beyond the basic syntax constraints imposed by XML itself. Accordingly, when using SOAP as a network protocol layer, the XML which is transmitted must conform to the XML schema requirements. That is, a payload formatted in the XML must be scoped to a valid XML namespace and the XML content must schematically conform to the schema represented by that namespace.

In short (based on, e.g., the type of message and/or operation used—for example, a "request" message for a "put" operation, a "response" message to a "get" operation, etc.), the message must not violate the constraints of the associated XML schema. For example, suppose an XML schema defined A, B, and C as minOccurs="1"—as shown in the following pseudo-code for a hypothetical XML schema:

```
<xs:element name="MyObject">
    <xs:complexType>
        <xs:sequence>
            <xs:element name="A" type="xs:int" minOccurs="1"
            maxOccurs="1" />
            <xs:element name="B" type="xs:int" minOccurs="1"
            maxOccurs="1" />
            <xs:element name="C" type="xs:int" minOccurs="1"
            maxOccurs="1" />
...
```

A SOAP message that included one of these elements must include values for all three—since the schema mandates that all three be present. Otherwise, the SOAP message when processed for validation would be considered "illegal" and should be faulted.

At the same time, mechanisms are emerging that allow users to "filter" XML using query engines so that unnecessary content is not returned to the caller. A filter engine may also be called an "inverse query engine," where (unlike a database wherein an input query is tried against a collection of data records) the engine tries an input against a collection of queries. Each query includes one or more conditions, criteria, or rules that must be satisfied by an input for the query to evaluate to true against the input. For example, an XPath filter engine is a type of inverse query engine in which the filters are defined using the XPath language. The message bus filter engine matches filters against XML to evaluate which filters return true, and which return false. The input for the various filters (e.g., XPath expressions) may be defined using various path expressions, operators, and functions as defined by the particular language used.

Although inverse query filters with their extensive tools allow for flexible and powerful searching mechanisms, there is currently no way to use them for modifying XML documents. In addition, these filter engines are often incapable of being used in a SOAP environment since the resulting output yielded by executing or processing such query expressions often violate the qualified schemas for the SOAP messages. Nevertheless, with the increased popularity of filtering and node-selection, there have been many attempts to create mechanisms by which such inverse query filters can be used over SOAP without violating the schema rules required.

One such solution suggests defining elements as "optional" within the schema. Although this approach may appear reasonable, it is often impractical for most real world situations. More specifically, schemas are often designed by the industry or service for which they or used or by some other standards body. Accordingly, the schemas are typically designed outside the SOAP environment for specific use within the boundaries considered most useful to that particular service. For example, a book seller may consider that consumers most often find helpful the title, author, ISBN, publisher, and price when search for a particular book. Accordingly, the seller ties these elements together in the schema since having any one of these elements as optional would be of little use to targeted consumers. Due to cost considerations for defining new schemas, when a service is designed to conform to SOAP protocols developers just borrow the schemas previously defined by the industry. As such, the SOAP messages will also be required to include all of the elements defined by the previously created schema, thus not allowing for full support of inverse query filtering.

Another suggested option has been to define different schemas for all possible combinations of resulting elements. Such an approach, however, not only suffers from the same inherent problems identified above, but is even more impractical in implementation. For example, if a service has even a relatively small number of say four elements, then at least twelve different schemas must be written to cover all possible combinations of the elements. Accordingly, a service with a relatively large number of elements would need hundreds, thousands, or even hundreds of thousands of schemas to describe the needed selections, which is economically and practically unfeasible.

BRIEF SUMMARY

The above-identified deficiencies and drawbacks of inverse filtering in a SOAP environment are overcome through example embodiments of the present invention. For example, embodiments described herein provide for updating service documents using inverse query expressions within a SOAP message, as well as sending results or inputs of a query as fragments of XML content that is otherwise required by a schema to be sent as a whole. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example embodiment provides for updating a targeted document using a inverse query expression within a SOAP message, wherein inverse query expressions are typically used for query purposes as opposed to modifications to a targeted document. In this embodiment, a request SOAP message is received that identifies a targeted XML document in a distributed service. An inverse query expression is then identified within the request SOAP message, which defines a location for content within the targeted XML document. This location within the targeted XML document is then accessed using the inverse query expression and an operation within the request SOAP message is identified that defines an action to perform on the content within the targeted XML document. Based on the operation defined within the request SOAP message, the content within the targeted XML document is altered at the location defined by the inverse query expression.

Another example embodiment provides for sending results of query expressions as XML fragments of content that is otherwise required by a schema to be sent as a whole. In this embodiment, a query expression is evaluated that defines a location within a targeted XML document. The targeted XML document is qualified by an XML schema that requires a piece of content within the targeted XML document to be sent as a whole such that a SOAP processor would find a SOAP message with a subset of the content in violation of the XML schema. Thereafter, an operation would be preformed on the targeted XML document at the location defined by the query expression, wherein the operation produces a result that selects a subset of the content within the targeted XML document to be returned to a client. A response SOAP message is then created that includes the subset of content as part of a payload. Note that the subset of content within the payload is encapsulated as child element(s) within a wrapper construct that is schematized in such a way that the SOAP processor suppresses validation of the child elements in order to pass the response SOAP message as conforming to the requirements of the XML schema when sending the subset of content to the client.

Another example embodiment provides for computer-readable media having stored thereon a data structure representing a SOAP message. The data structure includes a body portion that provides a payload of a message. Further, the data structure has a subset of content for an XML document within the payload. The content of the XML document being qualified by an XML schema that requires the content to be sent as a whole. Further, the data structure includes a wrapper construct that encapsulates the subset of content as child element(s). The wrapper construct being schematized in such a way that a SOAP processor is required to suppress validation of the child elements in order to pass the body portion of the SOAP message as conforming to the requirements of the XML schema.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates a flow diagram for a method of updating a targeted document using an inverse query expression within a SOAP message in accordance with example embodiments; and FIG. 3 illustrates a flow diagram for a method of sending results of a query as XML fragments of content that is otherwise required by a schema to be sent as a whole in accordance with example embodiments.

DETAILED DESCRIPTION

Figure 1A:
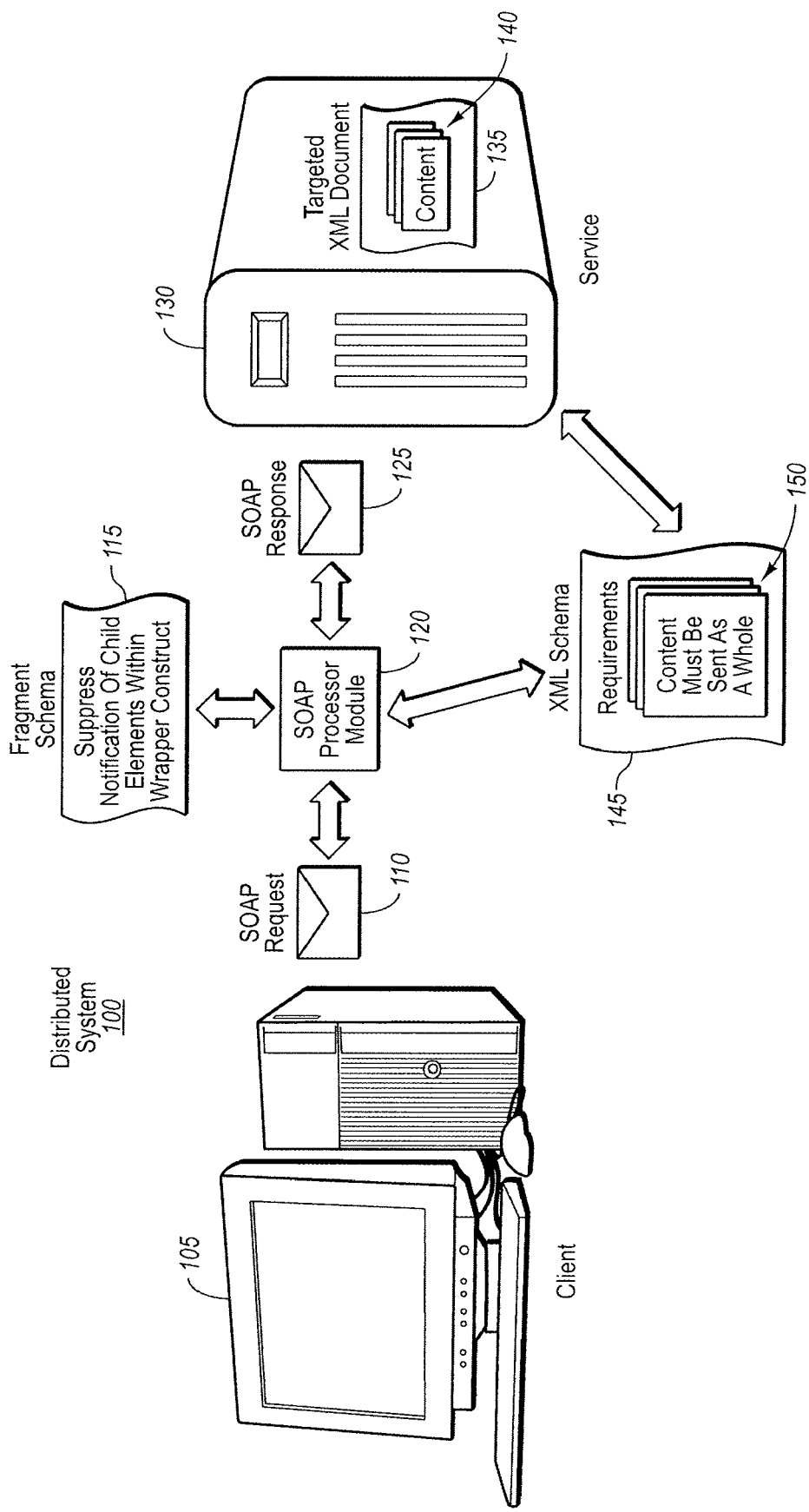
FIG. 1A illustrates a distributed system configured to utilize a fragment schema that suppresses validation of child elements within a wrapper construct for SOAP messages in accordance with example embodiments.

The present invention extends to methods, systems, and computer program products for overcoming various deficiencies and drawbacks of inverse filtering in a SOAP environment. The embodiments of the present invention may comprise a special purpose or general-purpose computer including various computer hardware or modules, as discussed in greater detail below.

As noted above, there are several inherent problems with inverse filtering and especially when using such systems in a SOAP environment qualified by rigid schemas. In one embodiment, inverse query expressions can be utilized within a SOAP message to not only query for information, but to also modify or otherwise update a targeted XML document. In such an embodiment, a client can send a SOAP message that includes an inverse query expression (e.g., XPath expression), which usually includes a path for defining a location within an XML document. As noted before, this path may further include operators and functions typical of inverse query languages such as XPath. Such expressions can then be used to locate either sub-portions or full nodes within an XML document for modifying or changing portions thereof. For example, a SOAP message may include operations such as "put", "create", "delete", or the like in conjunction with the inverse query expression for otherwise modifying a targeted XML document.

Note that in this and other embodiments, some operations (e.g., "put" or "create") will also include an updated expression within the payload of a SOAP message, which includes the new content. For example, if new content is being "put" into the targeted document, then the payload of the SOAP message will typically include the new content as well. Nevertheless, not all update operations require an update expression with new content. For instance, a "delete" operation may simply have the path with a default operation that states all content after the path should be deleted. Accordingly, the term "query expression" as used herein should be broadly defined to include the path that identifies the node or location within the targeted document, as well as the updated expression that includes the new content, if applicable.

In other embodiments, mechanisms are provided for transferring fragments or sub-portions of content for an XML document within a SOAP message. As noted above, such fragments are usually by themselves not schematically valid. In other words, the XML document is qualified to an XML schema that otherwise requires portions of content to be transferred as a whole. As such, a SOAP message when being processed for validation would otherwise be violating the requirements of the schema when transferring only fragments of the overall content. Nevertheless, embodiments provide for encapsulating the fragmented portions of the content within a special wrapper construct that allows the subset to suddenly become legal XML; thus passing most any validation test imposed by SOAP processors. More specifically, the wrapper construct is itself schematized as requiring that SOAP processors skip or otherwise suppress processing any child elements within the contained wrapper.

Note that in some embodiments, depending upon the operation requested, the SOAP message may also include both the inverse query expression as well as the fragment of XML content as described above. Examples of operations that will typically include both the query expression and fragments include "put", "replace", "create", or other similar type of operations. Operations such as "get", "delete", and/or "remove", however, will generally not include such fragmented payload. Nevertheless, embodiments consider that any of these operations can be combined in various manners within a single SOAP message and may also be used in conjunction with any number of query expressions. As such, there are instances for providing XML fragments within a SOAP message for operations that normally do not require such inclusion. Similarly, note that results of a request may or may not include XML fragments, again depending on such things as the type of operation(s) and processing formats defined as described in greater detail below.

Although more specific reference to advantageous features are described in greater detail below with regards to the Figures, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise computer storage media or communication media. Computer storage media includes RAM, ROM, EEPROM, CD-ROM or other optical disk storage, magnetic disk storage or other magnetic storage devices, whereas communication media includes any other medium which can be used to carry desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

FIG. 1A illustrates a distributed system 100 (e.g., a web service environment) that uses SOAP to make queries against a targeted XML document and receive responses thereto regardless of the type of XML schema defined for the targeted document. Note that the following description of FIG. 1A will occasionally refer to elements from FIG. 1B, and vise versa. As shown, a client 105 and service 130 communicate (using, e.g., remote procedure calls RPC) by transferring SOAP requests 110 and SOAP responses 125 between one another. When transferred, these SOAP messages 110, 125 will be validated using the SOAP processor module 120 in order to ensure that the XML schema 145 requirements 150 are met.

Note that SOAP processor module 120 may reside in any one of numerous places within the distributed system 100. For example, the SOAP processor module 120 may reside at the client 105, the service 103, or where in between, and can even reside at multiple places within the distributed system 100. Accordingly, the number of SOAP processing modules 120 and the placement thereof is used for illustrative purposes only and is not meant to limit or otherwise narrow the scope of embodiments herein described. Furthermore, the configuration and layout of various modules and components as described herein is also for illustrated purposes only.

Regardless of the configuration of the various components within distributed system 100, as previously alluded to targeted XML document 135 is qualified by XML schema 145. Note that the XML schema may be any well known schema type, e.g., XML Schema, RELAX NG, and possibly others. In any event, the XML schema includes a plurality of requirements 150 or conditions that SOAP requests 110 and responses 125 are required to conform to. As shown, one such condition 150 of the XML schema mandates that content 140 for the targeted XML document 135 must be sent as a whole. Note that content 140 as defined herein can include any number of elements, attributes, objects, values, etc., as defined by the developer of the schema 145. Accordingly, targeted XML document 135 may include any number of pieces of content 140; however, the individual pieces as defined by the XML schema 145 are required to be transferred within a SOAP message 110, 120 as a whole.

Figure 1B:
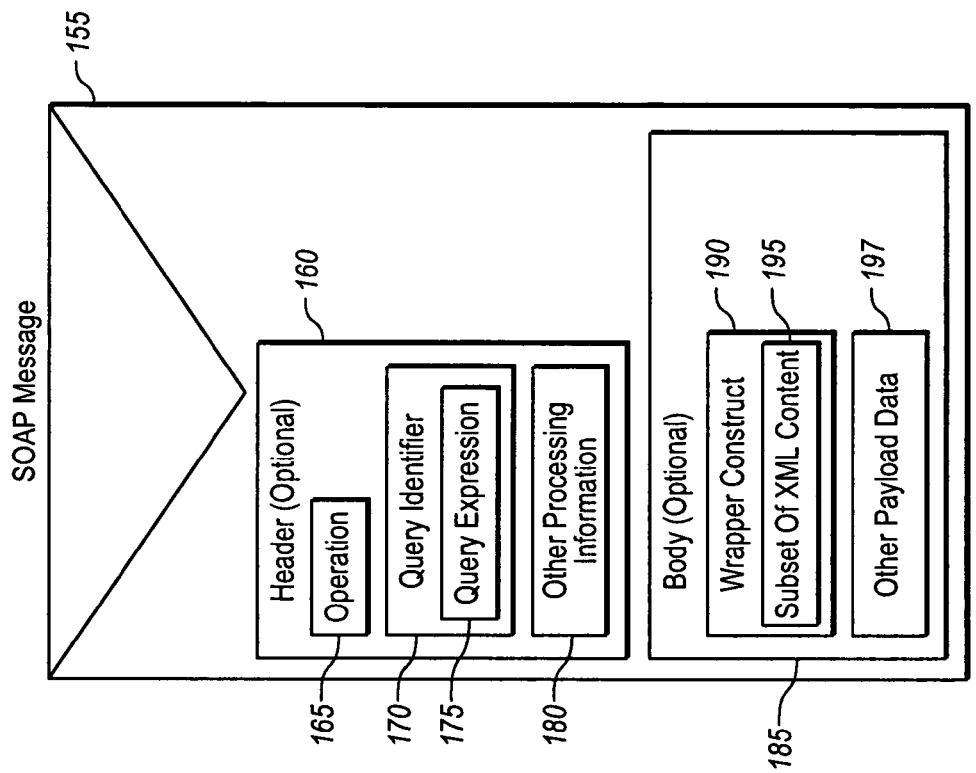
FIG. 1B illustrates the construction of a SOAP message in accordance with example embodiments.

Nevertheless, example embodiments provided herein allow for SOAP messages 110, 120 to include fragments or subsets of the content 140 that would otherwise not conform to the XML schema 145. For example, as shown in FIG. 1B, a SOAP message 155 is provided that includes various sections such as an envelope, a header 160 and a body 185 part. Note that depending upon the operation 165 (e.g., the get, put, create, delete, remove, copy, pull, etc.), type of message (e.g., request 110, response 125, etc.), or other protocols agreed upon, the body 185 or the header 160 of SOAP message 155 may be empty or otherwise "optional". For example, if the SOAP request 110 is a get or delete operation 165, typically the body portion 185 of the SOAP message 155 will be empty. On the other hand, if the SOAP request 110 is a "put" or "create" 165 message 155, the body portion 185 should include the content 140 or subset of content 195 to be modified or updated within the targeted XML document 135.

Also depending on the protocol or contract between the client 105 and service 103, the header and body portions of SOAP message 155 may be optionally filled. For example, assume that the contract indicates that all response messages 125 should include the results of an operation 165. Accordingly, even a response 125 to a "put" operation 165 may simply return the content 140 or fragment 195 specified in the request 110, or could simply return "true", "complete", "fault", or other indication within the body 185. On the other hand, if the protocol or contract does not require such information within the body 185 of all types of request 110 operations 165, then the body of a response 185 may otherwise be empty. Accordingly, the following examples that define properties for the header 160 and/or body 185 of SOAP messages 155 are used herein for illustrative purposes only and are not meant to limit or otherwise narrow the scope of embodiments herein.

Regardless of properties included within a SOAP message 155, as shown in FIG. 1B, a header 160 may include such things as an operation 165, (e.g., a put, create, get, delete, etc.); a query expression 175 (e.g., an inverse query expression such as XPath); and other processing or application specific information 180. Note, however, that any of these elements may be optionally included in the body 185 as described below. Nevertheless, the query expression 175 will normally be identified by wrapping it within a query identifier 170, and depending on embodiments described herein may or may not be an inverse query expression. Accordingly, the following description when referring to just a "query expression" 175 should be broadly construed to include all query expressions, unless otherwise explicitly expressed as an inverse query expression.

The SOAP message 155 may also include a body 185, which may include subset content 195 and/or other payload data. For example, when transferring fragments of content 140 for targeted XML document 135 in accordance with example embodiments herein described, the body will include a subset of XML content 195 encapsulated in a special wrapper construct 190. As will be described in greater detail below with regard to more explicit examples, the wrapper construct 190 is schematized (using fragment schema 115 from FIG. 1A) such that SOAP processors 120 are required to skip or otherwise suppress processing of child elements within the wrapper construct 190. Accordingly, SOAP messages 155 that would otherwise be considered illegal with respect to the XML schema 145 can now be validated.

For example, take the following simple targeted XML document 135:

```
<a>
    <b>
        <c> 10 </c>
        <d> 15 </d>
    </b>
</a>
``` that is qualified by an XML schema 145 that requires SOAP messages to transfer all of the given elements as a whole. As such, the following hypothetical fragment is typically not legal:

```
<s:Envelope>
    schema="some uri"
    <s:Header />
    <s:Body>
        <c> 10 </c>
    </s:Body>
</s:Envelope>
```

Accordingly, as previously described, a wrapper construct 190 is used to encapsulate the subset of XML content 195 as shown in the following XML body below:

```
<s:Body>
    <wsman:XmlFragment xmlns="schemas.some uri/management">
        <c> 10 </c>
    <wsman:XmlFragment>
</s:Body>
```

By wrapping the XML payload (i.e., the subset 195 of the above XML content) with the fragment wrapper construct 190, the fragment or subset of XML content suddenly becomes "legal" XML and will pass the validation test imposed by validating SOAP processors 120. This is because the wrapper construct 190 is schematized using the following pseudo fragment schema 115 code:

```
<xs:schema>
    ...
    <xs:element name="XmlFragment">
        <xs:complexType ... >
            <xs:complexContent mixed="true">
                <xs:restriction base="xs:anyType">
                    <xs:sequence>
                        <xs:any namespace="##other"
                            processContents="skip" minOccurs="0"
                            maxOccurs="unbounded" />
                    </xs:sequence>
                    <xs:anyAttribute namespace="##other"
                        processContents="skip" />
                </xs:restriction>
            </xs:complexContent>
        </xs:complexType>
    </xs:element>
    ...
</xs:schema>
``` that requires SOAP processors 120 to "skip" or otherwise suppress validation of all child elements within the wrapper construct 190. Accordingly, by encapsulating SOAP based XML payload (i.e., fragment or subset of XML content 195) with the above wrapper construct 190, any resulting input or output corresponding to a query expression 175 can be accommodated while still being valid SOAP.

Note, however, that some embodiments described herein do not require the use of XML fragments 195. For example, in one embodiment service 130 receives a SOAP request 110 that includes modification operations 165 such as a put, create, or delete operation(s) 165. In such embodiment, the SOAP request 110 will also include an inverse query expression 175 wrapped in identifier 170. The inverse query expression 175 may include paths, operators, and/or functions (as described for example by XPath language) that identify one or more locations within the targeted XML document. Note that the location(s) may define fractions of content 140 or entire nodes. Nevertheless, based on the location(s) identified, the targeted XML document 135 can modify the content 140 in accordance with the operation(s) 165 defined. Also note that because of the suppression features herein described, it is possible to include a subset of XML content 195 within a SOAP request 110 for such operations as a put or create.

As previously noted, in order to communicate the inverse query expression 170 itself, a SOAP header 160 (or body element 185) is added to a SOAP request 110, which can produce user-defined XML output. This header 160 can specify the inverse query expression path to apply before sending the result in the manner described above. The following illustrates one example XML code that can be used when requesting various operations to be preformed using an inverse query expression.

```
<s:Header>
    ... other headers ...
    <wsman:FragmentTransfer s:mustUnderstand="true">
        Xpath expression
    </wsman:FragmentTransfer>
</s:Header>
<s:Body>
    ...
```

Note that before composing the SOAP response 125, the server 130 should evaluate the inverse query expression 175 and then encapsulate the subset of XML content 195 or result using the wrapper construct 190 as previously described. In this manner, normal SOAP data retrieval operations (e.g., get, put, delete, create, etc.) can be subsequently improved by allowing inverse query expression 175 processing to silently occur over the top while retaining the strong validation semantics required by SOAP 145.

Also note that the service 130 may not support fragment or subset 195 transfer of XML content 140, in which a fault error may be returned to the client 105 requesting such fragments 195. Nevertheless, a conformant service 130 that supports fragment or subset XML content 195 transfer in accordance with embodiments described herein by excepting and typically including a SOAP header 160 in request 110 and responses 125 as follows:

```
<s:Envelope>
    <s:Header>
    ...
        <wsman:FragmentTransfer s:mustUnderstand="true">
            inverse query path to fragment
        </wsman:FragmentTransfer>
    ...
```

Note that the header 160 will typically appear once and also note the misunderstand attribute will typically be set to "true" such that both the service 130 and the client 105 can be certain that special modes of transfers are in progress. In some embodiments, a default value for the inverse query expression 175 may be an XPath URI (Uniform Resource Identifier). If, however, a value other than XPath is being used, a query language attribute will typically be added to indicate this in a manner similar to:

```
<s:Envelope>
    <s:Header>
        ...
        <wsman:FragmentTransfer s:mustUnderstand="true">
            QueryLanguage="uriToNewSelectorQueryLanguage">
            query text
        </wsman:FragmentTransfer>
        ...
```

In other words, XPath is a special case due to its importance; however, it is not mandated. Any other type of language or query to describe fragment or subset content transfers is permitted when, e.g., a query value is set to indicate to the service 130 what query language is being used.

Note also that the inverse query expression 175 or value may refer to an entire node, so the concept of fragment 195 can include an entire object or content 140. Accordingly, fragment transfer or subset content 195 transfer is a proper superset of normal transfer using SOAP messaging and the corresponding XML schema 145.

Further note that in the above pseudo code examples, various names, namespaces, and other references were used to describe the XML elements and attributes. There may be, however, any number of syntax that can be used for describing the XML pieces. As such, any specific name, namespaces, or references (as well as any specific elements, attributes, or other data structures) as used herein are for illustrative purposes only and are not meant to limit or otherwise narrow the scope of current embodiments.

As alluded to above, the operations 160 and query expressions 175 may also be included within the body portion 185. Also note that the arrangement of the operations 160 and the responses thereto (e.g., body 185) can occur and appear on the wire in any number of ways. For example, assume the following resource over which SOAP will operate:

```
<a>
    <b>
        <c> 1 </c>
        <d> 2 </d>
    </b>
</a>
```

Using this resource, a get may appear as

```
<soap:Envelope>
    <soap:Header>
        ...
    </soap:Header>
    <soap:Body>
        <Get xpath="a/b/c"/>
    </soap:Body>
</soap:Envelope>
``` and the resulting might be:

```
<soap:Envelope>
    <soap:Header>
        ...
    </soap:Header>
    <soap:Body>
        <c> 1 </c>
    </soap:Body>
</soap:Envelope>
```

An alternative for the get might be arranged slightly different as follows:

```
<soap:Envelope>
    <soap:Header>
        ...
    </soap:Header>
    <soap:Body>
        <Get> a/b/c </Get>
    </soap:Body>
</soap:Envelope>
```

Note that in this example, the XPath appears in the element content instead of an attribute. Nevertheless, the result would be the same as shown above.

For other operations 160 such as a put, the XPath should be paired with the new value as follows:

```
<soap:Envelope>
    <soap:Header>
        ...
    </soap:Header>
    <soap:Body>
        <Put xpath="a/b/c">
            <c> 7 </c>
        </Put>
    </soap:Body>
</soap:Envelope>
``` were similar to above the XPath appears as an attribute. In this example, the identity of the element a/b/c which was originally <c>1</c> in the original XML above will be updated to "7". After executing this put operation 160 the XML will look as follows:

```
<a>
    <b>
        <c> 7 </c>
        <d> 2 </d>
    </b>
</a>
```

Of course, there are ways that the put message might be structured. For example, consider the following where the XPath now becomes an element instead of an attribute:

```
<soap:Envelope>
    <soap:Header>
        ...
    </soap:Header>
    <soap:Body>
        <Put>
            <XPath> a/b/c </XPath>
            <NewValue>
                <c> 7 </c>
            </NewValue>
```

```
        </Put>
    </soap:Body>
</soap:Envelope>
```

Of course there are a variety of manners in which the put and other operation may be structured with their corresponding inverse query expression (in this example XPath). Typically, however, the inverse query expression 175 and any new value will be specified in some well-defined location.

As previously described, operations 160 and query expressions 175 can be combined in any number of various ways. For example, the above mechanism could also be extended to update both <c>and <d>at the same time as follows:

```
<soap:Envelope>
    <soap:Header>
        ...
    </soap:Header>
    <soap:Body>
        <Put>
            <Update>
                <XPath> a/b/c </XPath>
                <NewValue>
                    <c> 7 </c>
                </NewValue>
            </Update>
            <Update>
                <XPath> a/b/d </XPath>
                <NewValue>
                    <d> 2 </d>
                </NewValue>
            </Update>
        </Put>
    </soap:Body>
</soap:Envelope>
```

As shown, the XPath is again expressed as the element construct instead of an attribute, however, as previously noted the structure may appear in any numerous ways and in sum instances combinations of such structures may be allowed.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts is the recitation of the claims is used to indicate the desired specific use of such terms. Note, however, that any specific reference to steps and/or acts in the following description of the flow diagrams for FIGS. 2 and 3 are used as examples of steps and/or acts and is not meant to limit embodiments described herein unless explicitly claimed.

As previously mentioned, FIGS. 2 and 3 illustrate flow diagrams for various example embodiments of the present invention. The following description of FIGS. 2 and 3 will occasionally refer to corresponding elements from FIGS. 1A and 1B. Although reference may be made to a specific element from these Figures, such references are used for illustrative purposes only and are not meant to limit or otherwise narrow the scope of the described embodiments unless explicitly claimed.

FIG. 2 illustrates a flow diagram for a method 200 of updating a targeted document using an inverse query expression within SOAP message, wherein the inverse query expressions are typically used for query purposes as oppose to modifications to a targeted document. Method 200 includes an act of receiving 205 a request SOAP message. For example, service 130 may receive SOAP request 110 that identifies targeted XML document 135 in a distributed system 100. Method 200 also includes an act of identifying 210 an inverse query expression within the requested SOAP message. For example, server 130 may identify an inverse query expression (e.g., query expression 175 which in SOAP request 110), which defines a location for content 140 within the targeted XML document 135. Note that the inverse query expression may be an XPath expression that includes one or more path expressions, operators, or functions as defined by the XPath language. Of course, other languages may also be used provided the query languages are included within the SOAP request 110 .

Method 200 also includes a step for altering the content within the targeted XML document. Step for 230 includes a step for accessing 220 a location within the targeted XML document. More specifically, step for 220 includes an act of using 215 inverse query expression 175 to access the location within the targeted XML document 135. Thereafter step for 230 includes an act of identifying 225 at least one operation within the requested SOAP message. For example, using the inverse query expression 175 identified by the query identifier 170, server 130 can access the specified content 140 location within the targeted XML document 135. An operation within the SOAP request 110 that defines an action to perform on the content 140 may then be identified. For example, the operation 165 may be one of a put, create, delete, or any other operation that can modify the targeted XML document. Accordingly, based on the operation 165 defined within this request SOAP message, the content 140 within the targeted XML document 135 can be altered at the location defined by the inverse query expression 175.

Note that in this and other embodiments, some operations (e.g., "put" or "create") will also include an updated expression within the payload of a SOAP message, which includes the new content. For example, if new content is being "put"into the targeted document 135, then the payload or body 185 of the SOAP message 155 may also include the new content. Accordingly, the term "query expression" 175 as used herein should be broadly defined to include both the path that identifies the node or location within the targeted document 135, as-well as the updated expression that includes the new content, if applicable.

Also note that the operation 165 and/or inverse query expression 175 may be defined within a header 160 portion of the SOAP request message 110 . Further, the inverse query expression 175 will typically be wrapped within an identifier 170 for allowing the service 130 to evaluate the inverse query expression 175. Further note that when the operation 165 described above is a put, create, or similar operation 165, a payload within a body 185 of a request SOAP message 110 will typically include content 140 or even a subset of content 195. If the payload includes a fragment 195 of the content 140, it should be encapsulated as a child element within a wrapper construct 190 that is schematized 115 in such a way that a SOAP processor 120 is required to suppress validation of the child elements in order to pass the body portion 185 of the request SOAP message 110 as conforming to requirements of an XML schema 145 that otherwise requires the content 140 to be sent as a whole.

In another embodiment, after processing the operation in accordance with the inverse query expression 175 a result is determined from the operation 165 of the inverse query expression 175 that needs to be sent back to the client 105. If the result is a subset of content 195 of the targeted XML document 135 (which as previously noted is qualified by the XML schema 145 that requires the content 140 to be sent as a whole), a response SOAP message 125 may be created that includes the subset of content 195 or fragment as part of a payload within a body 185. Similar to above, the subset of content 195 is encapsulated within the payload as a child elements within a wrapper construct 190 that is schematized 115 in such a way as SOAP processor 120 is required to suppress validation of the child elements in order to pass the response SOAP message 125 as conforming to the requirements of the XML schema 145 when sending the subset of content to the client 105.

FIG. 3 illustrates a method 300 of sending query results as XML fragments of content that is otherwise required by a schema to be sent as a whole. Method 300 includes an act of evaluating a query expression that defines a location within a targeted XML document. For example, service 130 may evaluate query expression 175 that defines a location within the targeted XML document 135. Note that the query expression 175, however, in this embodiment may or may not come from a SOAP message. Further, the query expression may or may not be in an inverse query expression. As before, if the query expression 175 may be an XPath expression that includes path expressions, operators, or functions as defined by the language.

In any event, the query expression 175 identifies the targeted XML document 135, which is qualified by an XML schema 145 as previously described that requires a piece of content 140 within the targeted XML document 135 to be sent as a whole such that SOAP processor module 120 would find a SOAP message with a subset of a content 195 in violation of the XML schema 145. Note that the query expression 175 may allow to be wrapped with an identifier 170 for allowing the service 130 to evaluate the contents thereof.

Method 300 also includes an act of identifying 310 an operation to be preformed on the targeted document. For example, service 130 can identify an operation 165 to be performed on the XML document 135 at the location defined by the query expression 175. Such operations 165 may include, for example, a get, put, create, delete, or any other well known operation 165. Note that the operation 165 produces a result that selects a subset of content 195 within the target XML document 135 to be returned to client 105. Also note that the query expression 175 and the operation 165 may be defined within a header 160 portion of the request SOAP message 110.

Method 300 also includes an act of creating 315 a response SOAP message that includes a subset of content as part of a payload. For example, service 130 can create SOAP response 125 that includes a subset of content 195 as part of a payload. Method 300 then includes an act of encapsulating 320 the subset of contain within the payload as child elements within a wrapper construct. For example, service 130 will take the subset of XML content 195 and encapsulate it using wrapper construct 190 that is schematized 115 in such a way that the SOAP processor 120 is required to suppress validation of child elements in order to pass the response as conforming to the XML schema 145 when sending the subset of content to the client 105.

Note that if the operation is a put, create, or both, the request SOAP message 110 will usually include a subset of content 195 within the wrapper construct 190 as previously described. Alternatively, if the operation is one of a get, delete, or other similar operation, the body 185 for the request SOAP message 110 will typically be an empty set. Also, note that an identifier may be included within the header 160 portion of a SOAP message 155 indicating to the service 130 and/or client 105 that the payload includes a subset of content.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. At a service within a distributed computing system, a method of updating a targeted document using an inverse query expression within an SOAP message, wherein inverse query expressions are typically used for query purposes as opposed to modifications to a targeted document, the method comprising:

receiving a request SOAP message that identifies a targeted XML document in a distributed service, the targeted XML document being qualified by an XML schema that requires all elements defined in the XML schema to be included in the request SOAP message and wherein a payload within a body of the request SOAP message includes a subset of the required elements such that the payload of the response SOAP message would be in violation of the XML schema, the subset of required elements further being encapsulated as one or more child elements within a wrapper construct that is schematized in such a way that a SOAP processor is required to suppress validation of the one or more child elements in order to pass the payload of the request SOAP message as conforming to requirements of the XML schema even though the payload contains only a subset, rather than all, of the elements required by the XML schema;

identifying at least one inverse query expression within the request SOAP message, which defines a location for content within the targeted XML document;

using the at least one inverse query expression to access the location within the targeted XML document;

identifying at least one operation within the request SOAP message that defines an action to perform on the content within the targeted XML document; and based on the at least one operation defined within the request SOAP message, altering the content within the targeted XML document at the location defined by the at least one inverse query expression such that the content within the targeted XML document rather than content of the request SOAP message is altered.

2. The method of claim 1, wherein the inverse query expression and operation are defined within a header portion of the request SOAP message, and wherein the inverse query expression is wrapped within an identifier for allowing the service to evaluate the inverse query expression.

3. The method of claim 1, wherein the inverse query expression is an Xpath expression that includes one or more path expressions, operators, or functions.

4. The method of claim 1, wherein the at least one operation is one or more of a put, create, or delete.

5. The method of claim 1, wherein after processing the at least one operation in accordance with the inverse query expression, the method further comprises:

determining that a result from the operation of the inverse query expression needs to be sent to a client, wherein the result is a subset of elements of the targeted XML document, which is qualified by an XML schema that requires that all elements defined in the XML schema be included in a SOAP message such that a SOAP processor would find a SOAP message with the subset of the required elements in violation of the XML schema;

creating a response SOAP message that includes the subset of required elements as part of a payload within a body; and encapsulating the subset of required elements within the payload as one or more child elements within a wrapper construct that is schematized in such a way that the SOAP processor is required to suppress validation of the one or more child elements in order to pass the response SOAP message as conforming to the requirements of the XML schema when sending the subset of required elements to the client.

6. The method of the claim 5, wherein an identifier is included within a header portion of the response SOAP message indicating to the client that the payload includes the subset of required elements.

7. At a service within a distributed computing system, a method of sending results of a query as a subset of XML elements required by an XML schema rather than sending all elements required by the XML schema, without writing a schema where elements are optional or otherwise writing a plurality of different schemas for different query results, the method comprising:

evaluating a query expression that defines a location within a targeted XML document, the targeted XML document qualified by an XML schema that requires all elements defined in the XML schema to be included in a SOAP message such that a SOAP processor would find a SOAP message with a subset of the required elements in violation of the XML schema;

identifying at least one operation to be performed on the targeted XML document at the location defined by the query expression, the at least one operation producing a result that selects a subset of the required elements within the targeted XML document to be returned to a client;

creating a response SOAP message that includes the subset of the required elements as part of a payload but that does not include all the elements that are required by the XML schema such that the payload of the response SOAP message is in violation of the XML schema; and encapsulating the subset of required elements within the payload as one or more child elements within a wrapper construct that is schematized in such a way that the SOAP processor is required to suppress validation of the one or more child elements in order to pass the response SOAP message as conforming to the requirements of the XML schema when sending the subset of required elements to the client.

8. The method of claim 7, wherein the query expression is an inverse query expression and both the inverse query expression and the operation are defined within a header portion of a request SOAP message, and wherein the inverse query expression is wrapped within an identifier for allowing the service to evaluate the inverse query expression.

9. The method of claim 7, wherein the inverse query expression is an Xpath expression that includes one or more path expressions, operators, or functions.

10. The method of claim 7, wherein the at least one operation is one or more of a get, put, create, or delete.

11. The method of claim 7, wherein the at least one operation is a put, create, or both, and wherein a payload within a body of the request SOAP message includes a subset of required elements, which is encapsulated as one or more child elements within a wrapper construct that is schematized in such a way that a SOAP processor is required to suppress validation of the one or more child elements in order to pass the body portion of the request SOAP message as conforming to requirements of an XML schema that otherwise requires that all elements specified in the XML schema be included in the request SOAP message.

12. The method of claim 7, wherein the at least one operation is a create or delete, and wherein a body for the request SOAP message is empty.

13. The method of claim 7, wherein an identifier is included within a header portion of the response SOAP message indicating to the client that the payload includes the subset of required elements.

14. One or more computer storage media having stored thereon computer-executable instructions which when executed perform a method of updating a targeted document using an inverse query expression within an SOAP message, wherein inverse query expressions are typically used for query purposes as opposed to modifications to a targeted document, the method comprising:

receiving a request SOAP message that identifies a targeted XML document in a distributed service, the targeted XML document being qualified by an XML schema that requires all elements defined in the XML schema to be included in the request SOAP message and wherein a payload within a body of the request SOAP message includes a subset of the required elements such that the payload of the response SOAP message would be in violation of the XML schema, the subset of required elements further being encapsulated as one or more child elements within a wrapper construct that is schematized in such a way that a SOAP processor is required to suppress validation of the one or more child elements in order to pass the payload of the request SOAP message as conforming to requirements of the XML schema even though the payload contains only a subset, rather than all, of the elements required by the XML schema;

identifying at least one inverse query expression within the request SOAP message, which defines a location for content within the targeted XML document;

using the at least one inverse query expression to access the location within the targeted XML document;

identifying at least one operation within the request SOAP message that defines an action to perform on the content within the targeted XML document; and based on the at least one operation defined within the request SOAP message, altering the content within the targeted XML document at the location defined by the at least one inverse query expression such that the content within the targeted XML document rather than content of the request SOAP message is altered.

15. The one or more computer storage media of claim 14 wherein the method further comprises:

determining that a result from the operation of the inverse query expression needs to be sent to a client, wherein the result is a subset of elements of the targeted XML document, which is qualified by an XML schema that requires that all elements defined in the XML schema be included in a SOAP message such that a SOAP processor would find a SOAP message with the subset of the required elements in violation of the XML schema;

creating a response SOAP message that includes the subset of required elements as part of a payload within a body; and encapsulating the subset of required elements within the payload as one or more child elements within a wrapper construct that is schematized in such a way that the SOAP processor is required to suppress validation of the one or more child elements in order to pass the response SOAP message as conforming to the requirements of the XML schema when sending the subset of required elements to the client.

16. One or more computer storage media having stored thereon computer-executable instructions which when executed perform a method of sending results of a query as a subset of XML elements required by an XML schema rather than sending all elements required by the XML schema, without writing a schema where elements are optional or otherwise writing a plurality of different schemas for different query results, the method comprising:

evaluating a query expression that defines a location within a targeted XML document, the targeted XML document qualified by an XML schema that requires all elements defined in the XML schema to be included in a SOAP message such that a SOAP processor would find a SOAP message with a subset of the required elements in violation of the XML schema;

identifying at least one operation to be performed on the targeted XML document at the location defined by the query expression, the at least one operation producing a result that selects a subset of the required elements within the targeted XML document to be returned to a client;

creating a response SOAP message that includes the subset of the required elements as part of a payload but that does not include all the elements that are required by the XML schema such that the payload of the response SOAP message is in violation of the XML schema; and encapsulating the subset of required elements within the payload as one or more child elements within a wrapper construct that is schematized in such a way that the SOAP processor is required to suppress validation of the one or more child elements in order to pass the response SOAP message as conforming to the requirements of the XML schema when sending the subset of required elements to the client.

17. The one or more computer storage media of claim 16 wherein the method further comprises:

wherein the at least one operation is a put, create, or both, and wherein a payload within a body of the request SOAP message includes a subset of required elements, which is encapsulated as one or more child elements within a wrapper construct that is schematized in such a way that a SOAP processor is required to suppress validation of the one or more child elements in order to pass the body portion of the request SOAP message as conforming to requirements of an XML schema that otherwise requires that all elements specified in the XML schema be included in the request SOAP message.

* * * * *